United States Patent
Chen et al.

(10) Patent No.: US 8,577,139 B2
(45) Date of Patent: Nov. 5, 2013

(54) METHOD OF ORTHOIMAGE COLOR CORRECTION USING MULTIPLE AERIAL IMAGES

(75) Inventors: Liang-Chien Chen, Taoyuan County (TW); Wen-Chi Chang, Taipei (TW); Chien-Liang Liu, Taoyuan County (TW); Chia-Hwa Lin, Taoyuan County (TW)

(73) Assignee: National Central University, Jhongli (TW)

( * ) Notice: Subject to any disclaimer, the term of this patent is extended or adjusted under 35 U.S.C. 154(b) by 229 days.

(21) Appl. No.: 13/169,772

(22) Filed: Jun. 27, 2011

(65) Prior Publication Data

US 2012/0275698 A1   Nov. 1, 2012

(30) Foreign Application Priority Data

Apr. 28, 2011  (CN) .................................. 100114793

(51) Int. Cl.
*G06K 9/00*  (2006.01)

(52) U.S. Cl.
USPC ........................................................ 382/167

(58) Field of Classification Search
USPC ......... 382/103, 113, 154, 162, 167, 190, 201, 382/284, 294, 295; 348/218.1; 707/736
See application file for complete search history.

(56) References Cited

U.S. PATENT DOCUMENTS

| | | | |
|---|---|---|---|
| 7,343,051 B1 * | 3/2008 | Hsu ................................ | 382/294 |
| 7,386,164 B2 * | 6/2008 | Shragai et al. ................ | 382/154 |
| 7,660,441 B2 * | 2/2010 | Chen et al. .................... | 382/113 |
| 8,374,428 B2 * | 2/2013 | Lepikhin et al. .............. | 382/167 |

\* cited by examiner

*Primary Examiner* — Jose Couso
(74) *Attorney, Agent, or Firm* — Jackson IPG PLLC

(57) ABSTRACT

A method for true-orthoimage color correction is provided. Aerial images and digital elevation models (DEMs) are used for balancing colors in orthoimages or true-orthoimages. Seam lines between images are also smoothed. Thus, color distinction between images is rectified and orthoimage quality is greatly enhanced.

7 Claims, 6 Drawing Sheets

METHOD OF ORTHOIMAGE COLOR CORRECTION USING MULTIPLE AERIAL IMAGES

TECHNICAL FIELD OF THE DISCLOSURE

The present disclosure relates to orthoimage color correction; more particularly, relates to balancing colors in orthoimages or true-orthoimages with the coordination by geometrical registration and smoothing seam lines between images for effectively correcting color distinction between images and enhancing orthoimage quality.

DESCRIPTION OF THE RELATED ARTS

In a geographical information system (GIS), orthoimages are usually used. The orthoimages are formed by aerial images with high spatial resolution to be used for city management or city planning. For correcting tilt displacement and relief displacement, only terrain is considered in the orthoimages traditionally (O'Neill and Dowman, 1988. The generation of epipolar synthetic stereo mates for SPOT images using a DEM, International Archives of Photogrammetry and Remote Sensing, 27(B3): 587-598; Kim et al., 2001. Development of robust algorithm for transformation of a 3D object point onto a 2D image point for linear pushbroom imagery, Photogrammetric Engineering and Remote Sensing, 67(4): 449-452.). But, for rectification of true-orthoimage, geometric distortion by ground objects has to be considered as well.

The ground object may include houses, roads and trees. For now, it is impossible to show earth surface by models completely. A possible way is to use simplified models for various objects. For example, in an area crowded with houses, digital building models and digital elevation models (DEMs) are used in algorithm for providing accurate positions of the objects and for rectification (Zhou et al, 2005. A Comprehensive study on urban true orthorectification, IEEE Transactions on Geoscience and Remote Sensing 43(9):2138-2147.).

A prior art is revealed in 2007. A master image is selected to be processed through hidden area detection by using an H-buffer algorithm; then, slave images from different view points are used for compensating the master image and seam lines formed during compensating are smoothed to reduce color distinction between images. Another prior art is found using image painting to compensate hidden areas of true-orthoimages (Wang, 2009. The True Orthophoto Generation for Frame Perspective Image, Proceedings of the 30th Asian Conference on Remote Sensing, October 18-23, Beijing, China, CD-ROM.).

As is known, orthoimage has high precision and is widely applied, except that orthoimage is rectified for the relief displacement by the terrain only and true-orthoimage is rectified for both of the distortion by the terrain and the geometric distortion by the ground objects. Traditionally, geometric processes are mainly used for orthoimage rectification and true-orthoimage rectification. Followed by more and more of their applications and the development of aerial digital photograph technology, multiple aerial images are used to generate orthoimages of a big area or to process hidden-area compensation for reducing hidden areas. However, orthoimages generated from multiple aerial images has a problem in color uniformity. It is because that images obtained at different times may have very different color scales, which may have very big impact on obtaining the final images. Hence, the prior arts do not fulfill all users' requests on actual use.

SUMMARY OF THE DISCLOSURE

The main purpose of the present disclosure is to balance colors in orthoimages or true-orthoimages with the coordination of geometrical registration and smooth seam lines between images for effectively correcting color distinction between images and enhancing orthoimage quality.

The second purpose of the present disclosure is to process two stages of color correction with considerations of relationships between object space and image space, where the first stage is to consider corresponding relations between images for processing images at the same ground positions to obtain their color calibration parameters for a good color balancing effect; and the second stage is to smooth seam lines formed during compensating between images for further enhancing quality of the orthorectification result To achieve the above purposes, the present disclosure is a method of orthoimage color correction using multiple aerial images, comprising steps of: (a) processing a global color correction by using multiple aerial images coordinated with digital elevation models (DEMs), where a gray value statistic is obtained for each aerial image individually and then orthoimages or true-orthoimages are processed through a global color correction according to the aerial images and the corresponding gray value statistics; and (b) processing a local color correction to seam lines between the orthoimages or true-orthoimages. Accordingly, a novel method of orthoimage correction using multiple aerial images is obtained.

BRIEF DESCRIPTIONS OF THE DRAWINGS

The present disclosure will be better understood from the following detailed description of the preferred embodiment according to the present disclosure, taken in conjunction with the accompanying drawings, in which FIG. 1 is the flow view showing the preferred embodiment according to the present disclosure;

DESCRIPTION OF THE PREFERRED EMBODIMENT

The following description of the preferred embodiment is provided to understand the features and the structures of the present disclosure.

Figure 1:
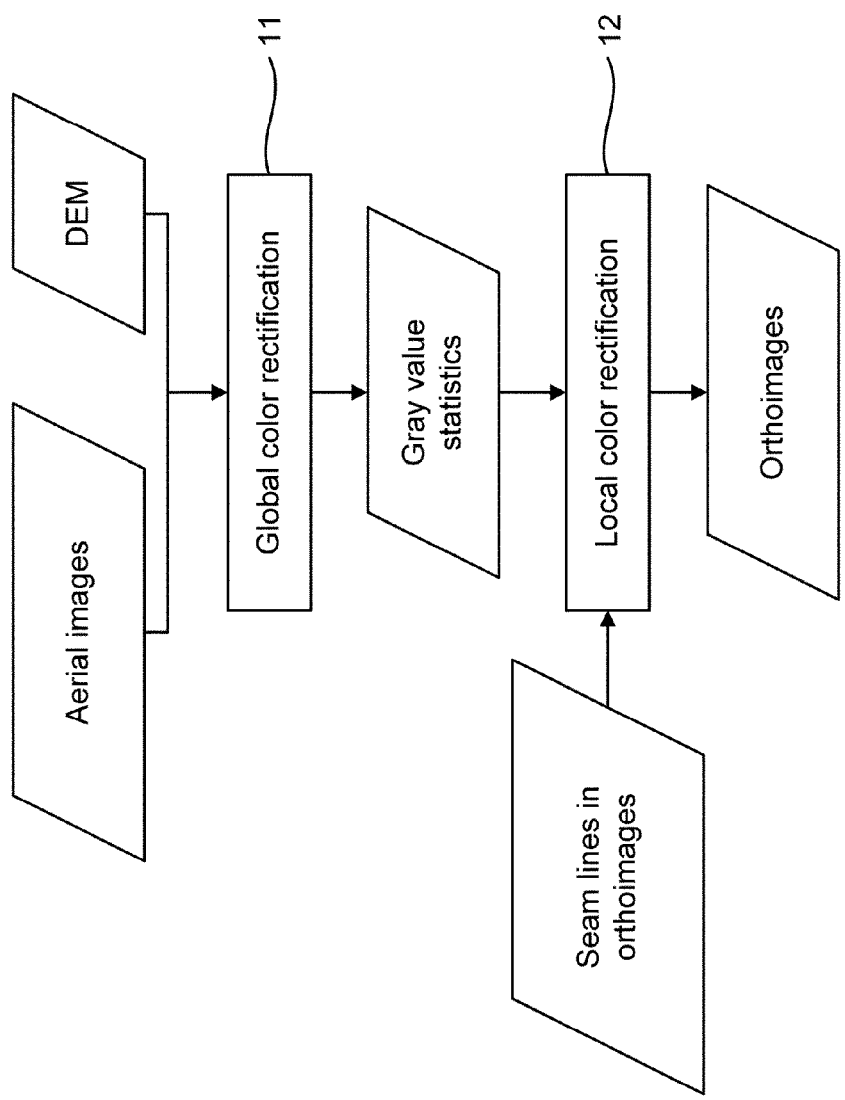

Please refer to FIG. 1, which is a flow view showing a preferred embodiment according to the present disclosure. As shown in the figure, the present disclosure is a method of orthoimage color correction using multiple aerial images, where aerial images, grid digital elevation models (DEMs) and orthoimages (or true-orthoimages) are used to process color balancing with coordination of geometrical registration and to smooth seam lines between images for enhancing image quality. The present disclosure comprises the following steps:

(a) Global color correction 11: Aerial image are used to be processed through a global color correction coordinated with digital elevation models (DEMs). A gray value statistic is generated for each aerial image individually and then a plurality of orthoimages or true-orthoimages is processed through a global correction according to the aerial images and the corresponding gray value statistics. Therein, the aerial images contain related parameters of relationships between object space and image spaces.

(b) Local color correction 12: A local color correction is processed to seam lines between the orthoimages or true-orthoimages.

Thus, a novel method of true-orthoimage color correction using multiple aerial images is obtained.

Figure 2:
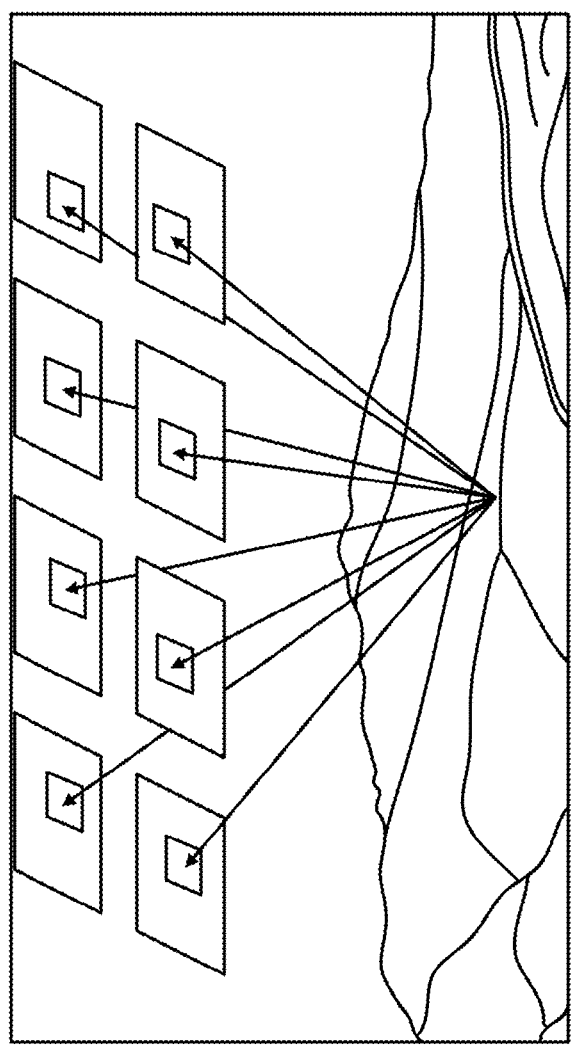
FIG. 2 is the view showing the image templates at the same position.
Figure 3:
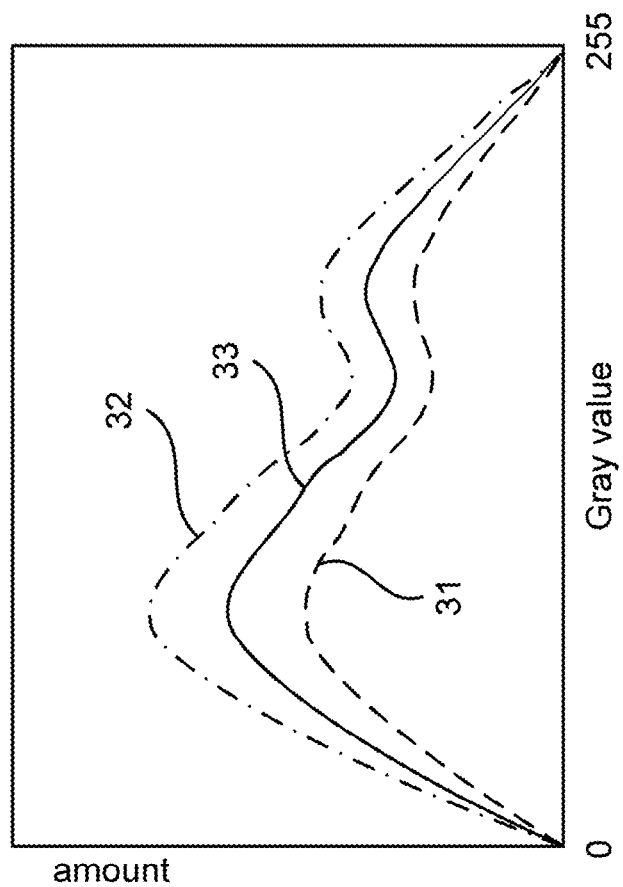
FIG. 3 is the view showing the gray value statistic of a template group.
Figure 4:
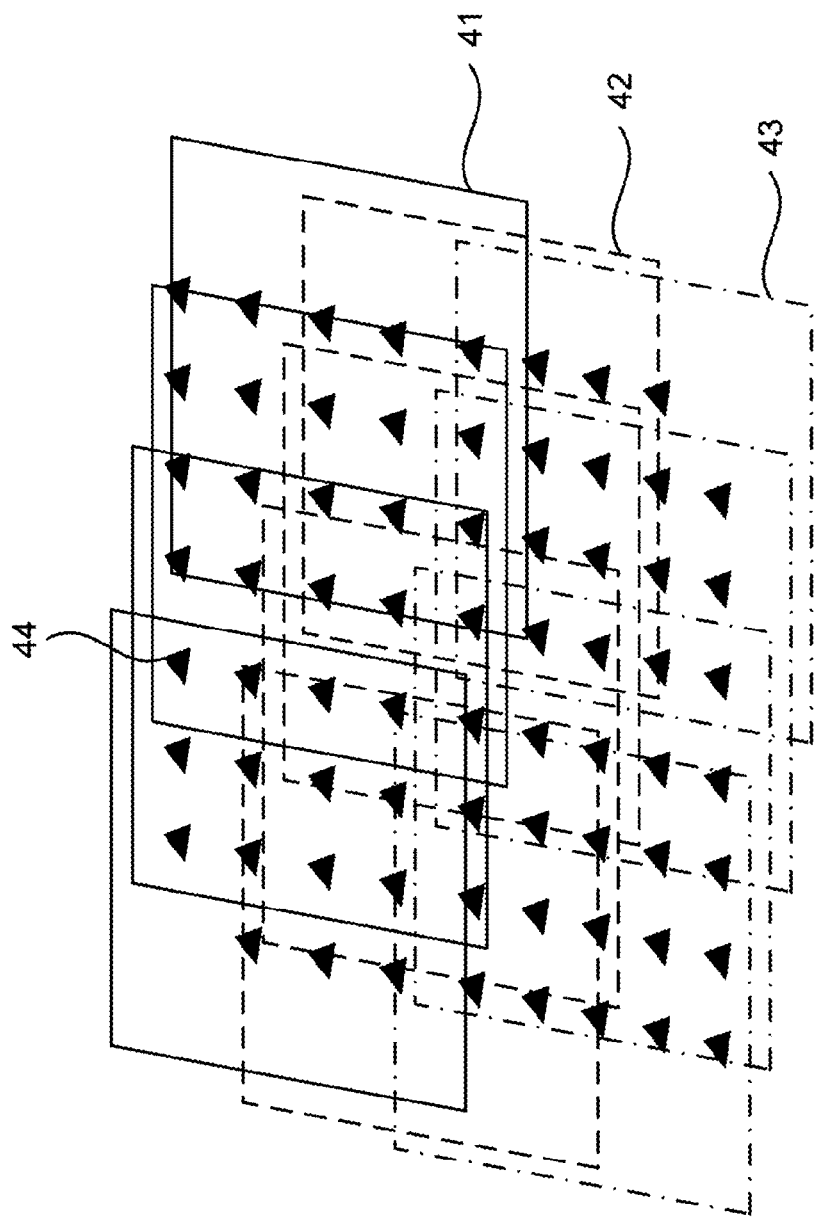
FIG. 4 is the view showing the gray value statistics of template groups.

Please further refer to FIG. 2 to FIG. 4, which are views showing image templates at the same position, a gray value statistic and gray value statistics. As shown in the figures, ground-point back-projection is processed in step (a) to obtain conjugate image templates (shown in FIG. 2) at the same ground position in the different aerial images. Take FIG. 3 as an example. By using the gray value statistics of multiple image templates, a first curve 31 and a second curve 32 shows the gray value statistics of two image templates and a third curve 33 shows a reference gray value statistic. A histogram matching is used to gather statistics of gray values of the image templates for building the gray value statistics. Therein, each gray value statistic is corresponding to a center position of an image template. In FIG. 4, gray value statistics are built at a fixed distance, where frame lines indicate photograph areas in the aerial images separately. Therein, the first frame lines 41, the second frame lines 42 and the third frame lines 43 separately show 12 different images in total along three aerial strips. The above-mentioned fixed distance, say 100 meters, is used to build control points 44. Planar positions of the control points 44 are acquired in advance and their height coordinates are provided by the DEMs. A back projection of the planar positions is processed to the aerial images for obtaining conjugate image templates according to the size of the temple as defined beforehand, e.g. a square having 400 pixels per boundary line, and for gathering a gray value statistic of every image template. In this way, the gray values of orthoimages or true-orthoimages are adjusted through interpolation according to the gray value statistics of the aerial images at corresponding positions.

Figure 5:
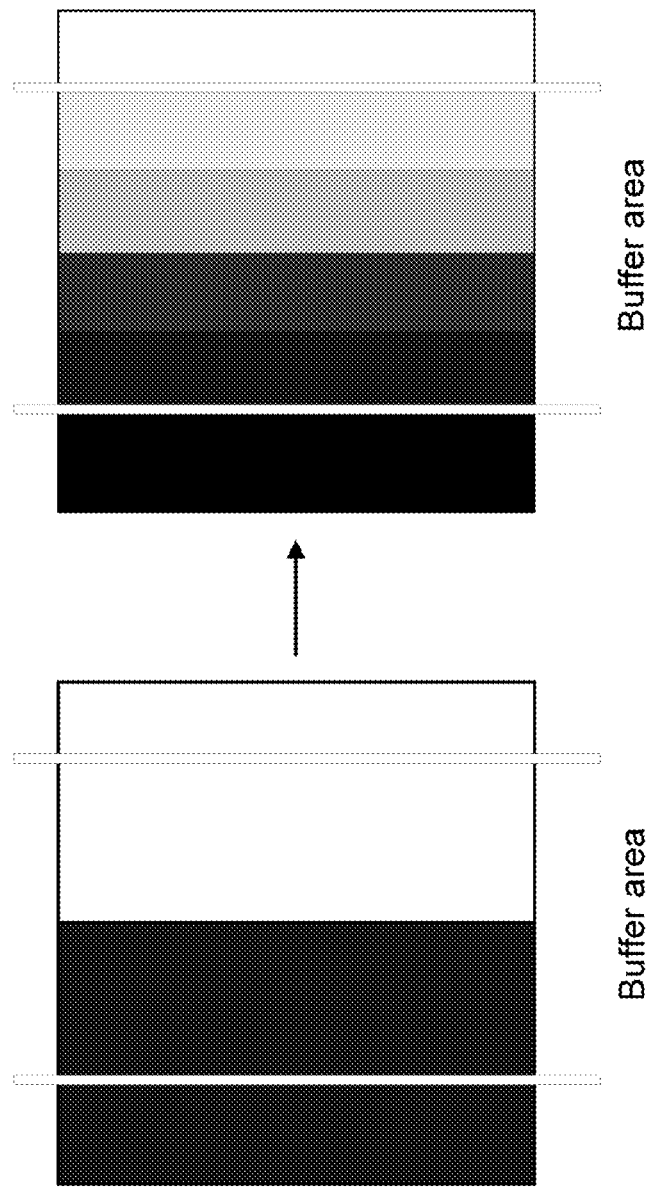
FIG. 5 is the view showing the local color balancing.
Figure 6:
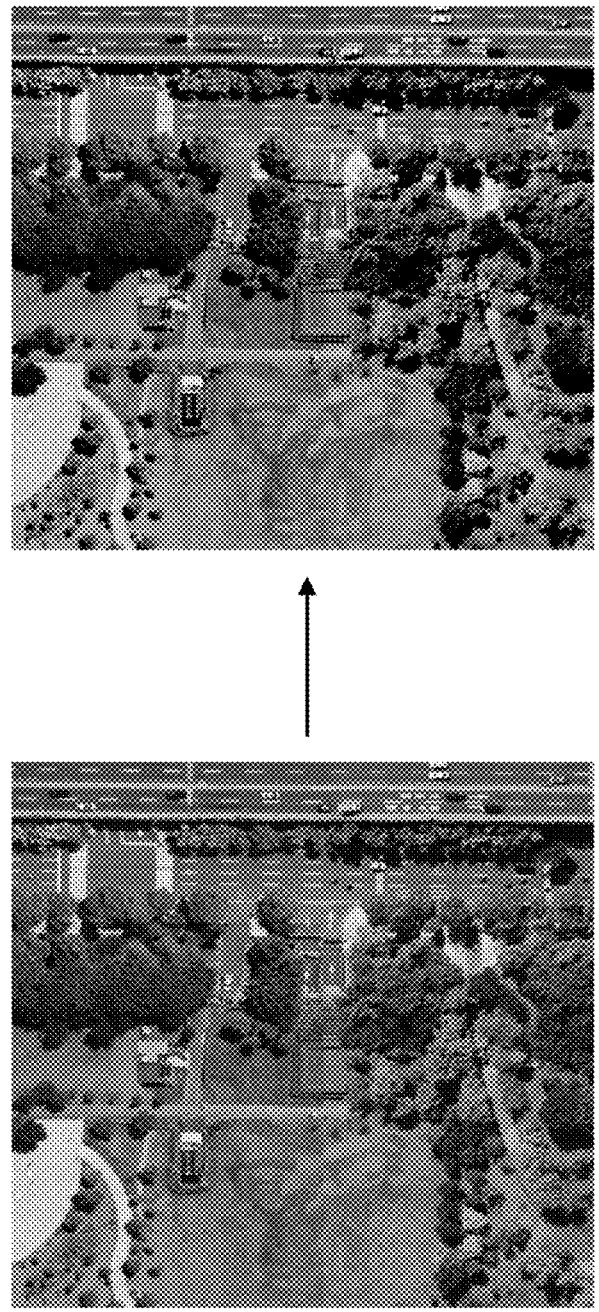
FIG. 6 is the view showing the image processed through the present disclosure.

Please further refer to FIG. 5 and FIG. 6, which are a view showing local color balancing; and a view showing an image processed through the present disclosure. As shown in the figures, seam lines embedded with the orthoimages or seam lines formed during hidden-area compensation of the true-orthoimages are processed in step (b). The present disclosure generates a buffer around each seam line. The image information of the buffers are come from master images and slave images used in mosaicking or compensating to be processed through weighted averaging by using reciprocals of distances to obtain final gray values. In FIG. 5, a seam line is obviously found between black and white parts in the beginning. The present disclosure generates a buffer around the seam line. The color at the center of the buffer around the seam line is obtained by averaging the colors of the two parts beside the seam line. Then, the color is gradually changed toward two sides of the seam line according to the reciprocal of distance to the center. In FIG. 6, the images before and after this kind of radiative calibration are shown.

Hence, the present disclosure considers relationships between object space and image space for two stages of correction. In the first stage, corresponding relations between images are considered. Images at the same ground positions are processed for obtaining their color calibration parameters. Thus, in the same image, different positions have their different calibration parameters. Further, for color balancing those images, the radiative calibrations are not uniform among the images but are processed with the coordination of geometrical registration for better color balancing results. In the second stage, seam lines formed during compensating images are smoothed for further enhancing quality of the orthorectification result.

To sum up, the present disclosure is a method of orthoimage color correction using multiple aerial images, where multiple aerial images are used for color balancing orthoimages or true-orthoimages; with the coordination of elevation information, conjugate image templates are obtained through object space back-rejection for obtaining similar radiation characteristics of conjugate blocks; seam lines between images are further smoothed; and the present disclosure thus effectively corrects color distinction between images and greatly enhances orthoimage quality.

The preferred embodiment herein disclosed is not intended to unnecessarily limit the scope of the disclosure. Therefore, simple modifications or variations belonging to the equivalent of the scope of the claims and the instructions disclosed herein for a patent are all within the scope of the present disclosure.

What is claimed is:

1. A computer executable method of orthoimage color correction using multiple aerial images, comprising steps of:
   (a) processing a global color correction by using a plurality of aerial images coordinated with digital elevation models (DEMs),
   wherein a gray value statistic is obtained for each of said aerial images individually and then a plurality of orthoimages or true-orthoimages is processed through a global color correction according to said plurality of aerial images and said corresponding gray value statistics;
   (b) processing a local color correction to seam lines between said plurality of orthoimages or true-orthoimages; and
   (c) outputting a result from the computer.

2. The method according to claim 1,
   wherein said plurality of aerial images is a plurality of remote sensing images containing related parameters of relationships between object space and image space.

3. The method according to claim 1,
   wherein, in step (a), ground-point back-projection is used to obtain conjugate image templates at the same ground position from said plurality of aerial images; a histogram matching is used to gather statistics of gray values of said image templates; and, a plurality of said gray value statistics is obtained at a fixed distance.

4. The method according to claim 3,
   wherein each of said gray value statistics is corresponding to a center position of one of said image templates.

5. The method according to claim 1,
   wherein, in step (a), gray values of said orthoimages or true-orthoimages are adjusted through interpolation according to said gray value statistics of said aerial images at corresponding positions.

6. The method according to claim 1,
   wherein, in step (b), seam lines embedded with said orthoimages or seam lines obtained during hidden-area compensation of the true-orthoimages are processed; and a buffer is obtained around each of said seam lines to be processed through weighted averaging by using reciprocals of distances to obtain final gray values.

7. The method according to claim 1,
   wherein image information of said buffers are obtained from master images and slave images used in mosaicking or compensating.

* * * * *